United States Patent
Tsengas et al.

(10) Patent No.: US 8,109,237 B1
(45) Date of Patent: *Feb. 7, 2012

(54) DEVICE FOR ACTUATING AUTOMATED LITTERBOX

(75) Inventors: Steven Tsengas, Fairport Harbor, OH (US); Michael O'Toole, Cleveland, OH (US)

(73) Assignee: OurPet's Co., Fairport Harbor, OH (US)

( * ) Notice: Subject to any disclaimer, the term of this patent is extended or adjusted under 35 U.S.C. 154(b) by 340 days.

This patent is subject to a terminal disclaimer.

(21) Appl. No.: 12/324,370

(22) Filed: Nov. 26, 2008

Related U.S. Application Data

(60) Provisional application No. 61/012,839, filed on Dec. 11, 2007.

(51) Int. Cl.
*A01K 29/00* (2006.01)

(52) U.S. Cl. ......... 119/166; 119/616

(58) Field of Classification Search .......... 119/163, 119/165, 166, 168
See application file for complete search history.

(56) References Cited

U.S. PATENT DOCUMENTS

| | | |
|---|---|---|
| 4,096,827 A | 6/1978 | Cotter |
| 4,117,804 A | 10/1978 | Moore et al. |
| 4,190,525 A | 2/1980 | Menzel |
| 4,325,325 A | 4/1982 | Larter |
| 4,325,822 A | 4/1982 | Miller |
| 5,048,465 A | 9/1991 | Carlisi |
| 5,226,388 A * | 7/1993 | McDaniel ............ 119/166 |
| 5,259,340 A * | 11/1993 | Arbogast ............ 119/166 |
| 5,477,812 A * | 12/1995 | Waters ............ 119/163 |
| 6,039,003 A * | 3/2000 | Cox ............ 119/166 |
| RE36,847 E | 9/2000 | Waters |
| 6,202,595 B1 * | 3/2001 | Atcravi ............ 119/165 |
| 6,205,954 B1 * | 3/2001 | Bogaerts ............ 119/166 |
| 6,283,065 B1 | 9/2001 | Shorrock et al. |
| 6,378,461 B1 * | 4/2002 | Thaler et al. ............ 119/166 |
| 6,951,190 B2 * | 10/2005 | Northrop et al. ............ 119/166 |
| 7,051,678 B2 * | 5/2006 | Strickland et al. ............ 119/165 |
| 7,137,355 B1 | 11/2006 | Wan ............ 119/166 |
| 7,198,006 B2 * | 4/2007 | Fischer ............ 119/166 |
| 7,230,539 B2 | 6/2007 | Klein |
| 7,261,058 B2 * | 8/2007 | Gillis et al. ............ 119/166 |
| 7,628,118 B1 * | 12/2009 | Nottingham et al. ......... 119/166 |
| 2007/0056521 A1 * | 3/2007 | Caputa et al. ............ 119/166 |
| 2008/0060585 A1 * | 3/2008 | Garfield ............ 119/165 |

* cited by examiner

*Primary Examiner* — Kimberly Smith

(74) *Attorney, Agent, or Firm* — John D. Gugliotta, PE, Esq

(57) ABSTRACT

An improved automated litter box comprises a motorized comb or rake drive mechanism for removing clumps, a means for cycling the drive mechanism, and a cat proximity sensor for sensing the relative position of a cat about or within said litter chamber. The cat proximity sensor is capable of identifying the location of a cat outside the litter box or litter box or litter chamber. The cat proximity sensor comprises a passive or inductive transmitter for identification for modulating and demodulating a radio frequency (RF) signal; and an antenna for receiving and transmitting a radio frequency (RF) signal.

18 Claims, 5 Drawing Sheets

DEVICE FOR ACTUATING AUTOMATED LITTERBOX

RELATED APPLICATIONS

The present application is a continuation of U.S. Application No. 61/012,839, filed Dec. 11, 2007 and claims benefit of that provisional's priority date. All applications are incorporated herein by reference thereto as though recited in full.

BACKGROUND OF THE INVENTION

1. Field of the Invention

The present invention is directed generally to automated self-scooping litter boxes, and, more particularly, to a novel and improved method of initiating a scooping or cleaning cycle therein.

2. Description of the Related Art

Cats, which are among the most popular types of domestic pets, are usually trained to use a litter box for elimination of both liquid and solid wastes. A cat litter box is normally made of a re-useable plastic or like material. Such a material does not allow a cat's urine to leak through the box, while at the same time provides an efficient, cleanable and reuseable waste container. Most cat owners take appropriate action to discard the litter from a cat litter box after an appreciable period of time, often several days. On the other hand, even before the litter has been thoroughly saturated with wastes from the cat or cats that use it, a cat may be inclined to push some of the litter out of the box, particularly if the odor is strong. In any event, the person using a cat litter box, usually the owner of the cat or cats, may find the task of emptying the cat litter to be personally obnoxious.

A number of prior art devices have been proposed for automating the cleaning of cat litter boxes; devices of this kind are disclosed in U.S. Pat. No. 4,096,827, U.S. Pat. No. 4,117,804, U.S. Pat. No. 4,190,525, U.S. Pat. No. 4,325,325, U.S. Pat. No. 4,325,822, U.S. Pat. No. 5,226,388 and U.S. Pat. No. 5,048,465.

Typical of these self-cleaning cat litter box designs are to utilize a rake or comb that is moved through the litter, periodically. The rake encounters and discharges any clumps collected by the comb into a disposal receptacle.

Of considerable relevance is U.S. Pat. No. RE36,847, issued in the name of Waters, for an improved automated self-cleaning litter box for cats, of the kind having a comb that is driven forward through the litter to a discharge end of the chamber where the clumped litter is then discharged from the litter box. The improvement of the '847 reference is focused primarily around a sensor for sensing the presence of a cat in the litter chamber, in which a photo electric sensor is preferred, but an infra red, weight, or even an audible sensor can be used. A delay device actuates the comb drive a predetermined time interval after the sensor ceases to sense the presence of a cat in the litter chamber.

As typified by the '847 reference, sensing the presence of the pet can be an important consideration, given a particular design for such an automated litter box. If the comb driving mechanism pushes the litter out of the box to a discharge end (as in the '847 reference), when the comb drive mechanism returns is can cause a potential impingement hazard to an animal that may be in the way. Similarly, if the scooping mechanism retrieves and stores the waste in a laterally articulated fashion (as in the U.S. patent application Ser. No. 11/708,368), a similar impingement hazard can occur. In order to prevent such a hazard, various strategies of sensor in combination with timers have been employed. However, all such strategies so far developed cannot accurately determine when to initiate an automated cleaning or scooping cycle, i.e. after the litter box has be used, but only after the animal has exited.

A search of the prior art did not disclose any patents that read directly on the claims of the instant invention; however, the following references were considered related.

U.S. Pat. No. 7,230,539, issued in the name of Klein, teaches a "Pet Identification Tag with Internal Cavity for Transponder Capsule", wherein a pet tag comprises an internal cavity that removably contains an FRID capsule transponder wrapped in a thick paper having a thin layer of metal that shuts out electromagnetic fields, so that consumers can select tracking options.

U.S. Pat. No. 6,283,065, issued in the name of Shorrock, et al., teaches a collar stud attachable to a pet collar to function as an identification device with two modes: (1) a visually discernible identification code; or, (2) an RFID transponder device programmed with a unique code so that the stud serves as an electronic identification tag for the host animal. The code is made part of the data records at a health care database to aid in locating a lost pet. The electronics may further promote feed control, wherein the dish opens to allow the pet to feed with it is in proximity.

Further, radio-frequency identification (RFID) tags or transponder device are commonly available and utilized to store and remotely retrieving data. An RFID tag is an object that can be applied to or incorporated into a product, animal, or person for the purpose of identification using radiowaves. Some tags can be read from several meters away and beyond the line of sight of the reader. Most RFID tags contain at least two parts. One is an integrated circuit for storing and processing information, modulating and demodulating a (RF) signal and can also be used for other specialized functions. The second is an antenna for receiving and transmitting the signal. A technology called chipless RFID allows for discrete identification of tags without an integrated circuit, thereby allowing tags to be printed directly onto assets at lower cost than traditional tags. RFID tags come in three general varieties: passive, active, or semi-passive (also known as battery-assisted). Passive tags require no internal power source, thus being pure passive devices (they are only active when a reader is nearby to power them), whereas semi-passive and active tags require a power source, usually a small battery.

While the present invention anticipates the use of a self scooping or otherwise automated litter box having a sensor initiated automation cycle incorporated into this invention in combination, other elements and improvements are different enough as to make the combination and improvement distinguished over the these references and the inventors' own prior art.

Consequently, a need has been felt for providing an apparatus and method of accurately and safely initiating the automation cycle of such devices.

SUMMARY OF THE INVENTION

It is a principal object of the present invention, therefore, to provide a new and improved drive sensor mechanism for initiating the movement of a rake or comb employed to remove litter from a cat litter box in an automated litter box device.

It is another object of the present invention to initiate such a cleaning cycle in a manner that is accurately responsive to the exit of a cat from the litter box.

It is a further object of the invention is to accurately sense the presence of a cat relative to the location of an automated litter box.

Finally, it is an object of the present invention to accurately sense when an animal has utilized a litter box, thereby providing reliable input for initiation of a cleaning or automated scooping cycle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

In order to describe the complete relationship of the invention, the present description is described as an improvement to an automated, self scooping litter box design as shown, described and claimed in U.S. Ser. No. 12/175,612. However, such a description is used only to give a typical relationship to the terms and functions of the present invention. It should be noted that in describing the present invention, it is anticipated that such an improvement can be implemented in conjunction with number of such automated cleaning or scooping litter box designs, and such should be broadly read into the definitions that are used throughout this application.

The best mode for carrying out the invention is presented in terms of its preferred embodiment, herein depicted within the Figures.

1. Detailed Description of the Figures

Figure 1:
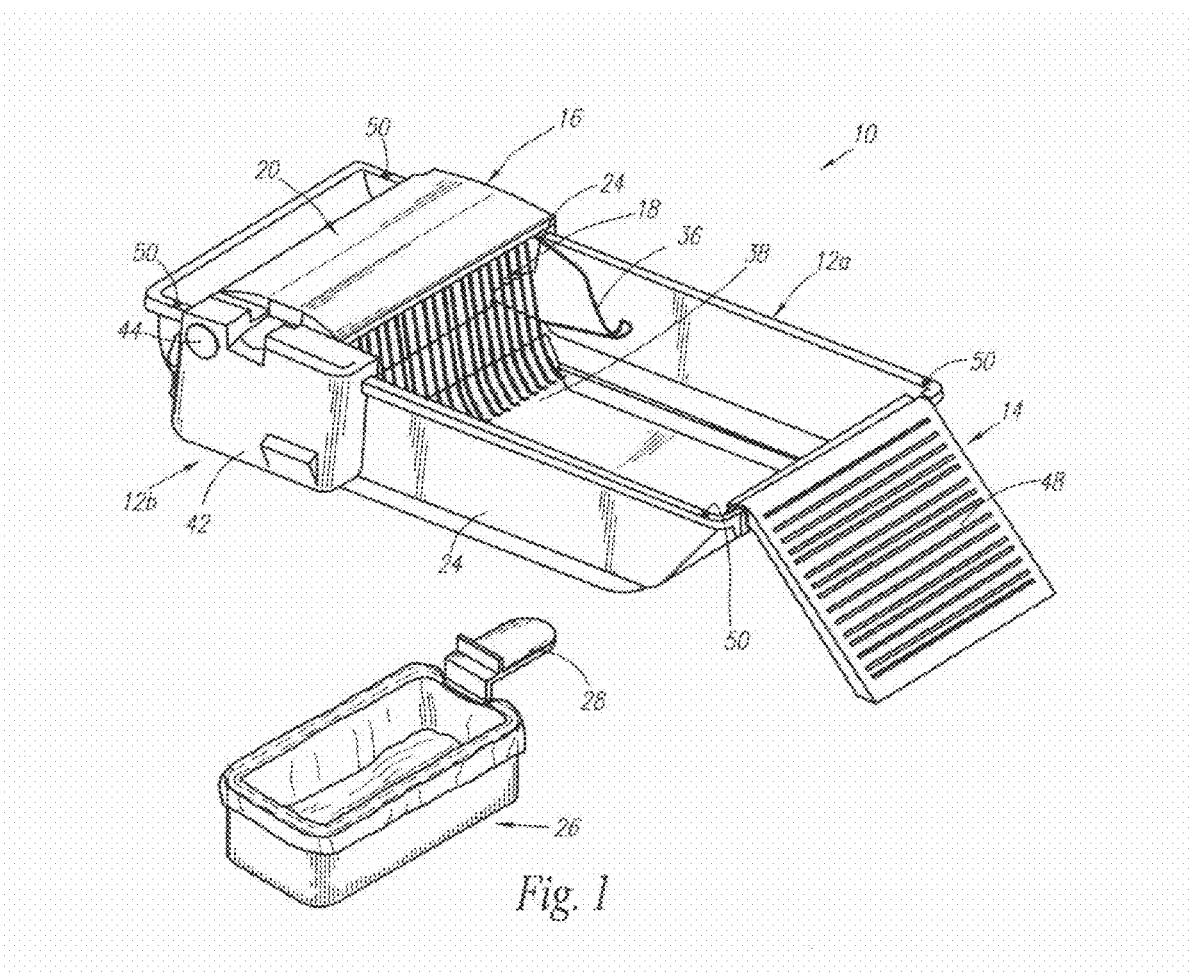
FIG. 1 is an elevational view of the automated cat litter box according to the preferred embodiment of the present invention.
Figure 2:
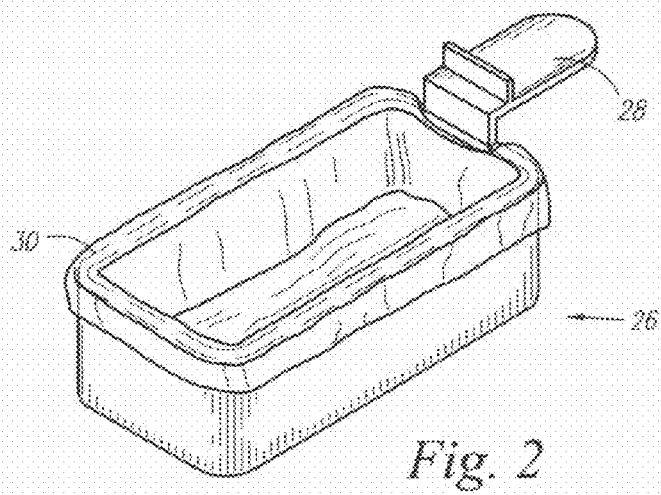
FIG. 2 is an elevational view of a tray according to the invention shown in FIG. 1.
Figure 3:
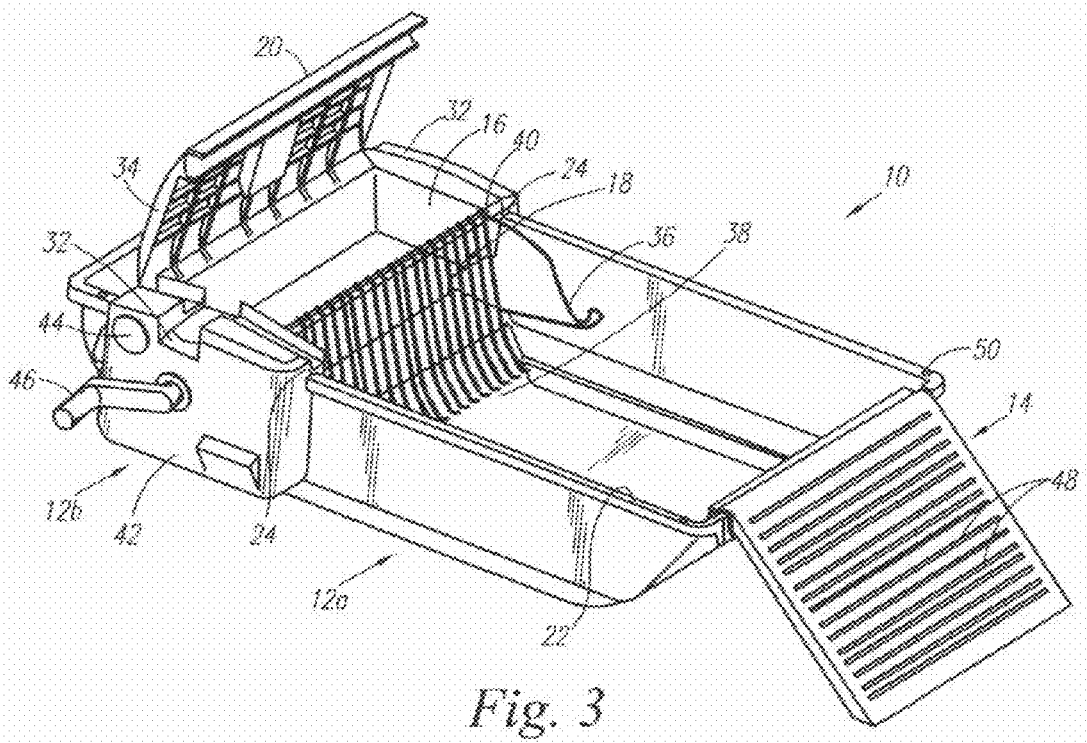
FIG. 3. is an alternate embodiment to the automated cat litter box, wherein a hand crank is used to replace the motorized driving mechanism.

The automated cat litter box 10 according to the preferred embodiment of the present invention is shown in FIGS. 1-3. To achieve the objectives of the present invention, the preferred embodiment comprises a deep rectangular litter pan 12a having a ramp 14 along its width at one end and a self-cleaning carriage 12b resting at the opposite end. The self-cleaning carriage 12b preferably comprises a waste drawer 16 having a rotating grate 18 vertically attached thereto. The length of the waste drawer 16 travels along the width of the litter pan 12; its depth approximates half the depth of the litter pan 12. A lid 20 is hingedly attached to the waste drawer 16 along its length.

FIG. 2 shows a tray 26 that is sized to fall into and fit into the waste drawer 16. A disposable and non-reusable plastic covering 30, or lining, is placed over the tray 26 so that waste can be speedily and easily removed. A handle 28 is positioned at the tray's 26 end so that the tray can be lifted out of the drawer 16 and the waste discarded. The handle 28 extends outwards through a window formed by a rectangular indentation 32 on the top edge of the drawer 16 and a curved indentation 34 on the edge of the lid 20 when the lid 20 is in a closed position.

The self-cleaning carriage 12b rests on the lip 22 of the pan 12 by means of an engagement rail 24. When the litter is self-cleaning, the self-cleaning carriage 12b travels along the lip 22 and also travels a guiding rim 36 extending outwards from the interior sidewall of the pan 12a. While the engagement rail 24 is carrying the entire self-cleaning carriage 12b along the length of the pan 12a, litter passes through the tines 38 of the rotating grate 18 while clumps of waste are pushed forward. The tines 38 can be straight or curved so as to better shovel the waste in the cleaning process. Towards the end of the guiding rim 36, the grate 18 rotates from its vertical position and climbs the curved shallow end of the pan 12a to a horizontal position. The grate 18 then flips backwards by means of a pivot rod 40 to shovel all of the clumped waste that the tines 38 sifted out of the litter into the tray 26 behind it. The grate 18 mechanically returns to the vertical position and the cleaning carriage 12b returns backwards along the same guiding rim 36 to its resting position.

The self-cleaning carriage 12b travels the length of the pan 12a by means of a motorized driving mechanism (not shown) housed in a cabin 42 attached to and adjacent to the drawer 16. It is envisioned that the cabin 42 is positioned outside of the litter box 10 so as to not consume any additional litter containing space in the litter pan 12a. A push lock release 44 positioned on the top of the cabin 42 provides access to the motor and the mechanical elements used to drive the cleaning carriage 12b.

In an alternate embodiment to the present invention, shown in FIG. 3, a hand crank can be used to drive the self-cleaning carriage 12b. In this embodiment, the driving mechanism is still housed in the cabin 42, but it is not motorized.

Another functional element comprised in the preferred embodiment includes horizontal ribs 48 extending across the ramp both to assist the cat in ingress and egress and to assist in catching any litter or clumps caught on the cat's paws before it is tracked throughout the home. Circular grooves 50 positioned on the lip 22 of the pan 12a at its four corners also provide a means for a litter box lid to be placed over the pan 12a.

Figure 4:
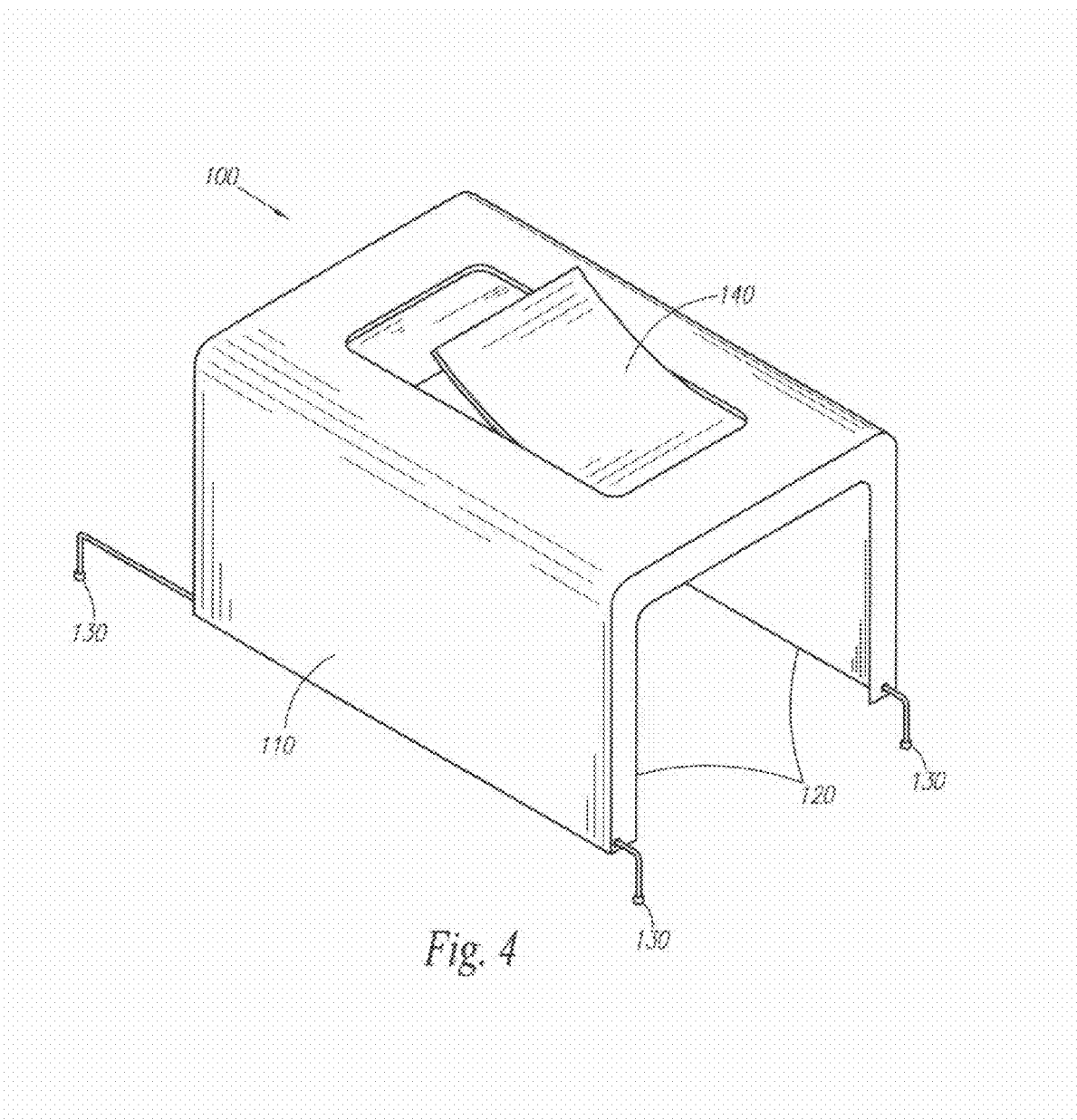
FIG. 4 is a litter box lid, wherein the construction is specific to and accommodates the design features of the automated cat litter box disclosed therein.
Figure 5:
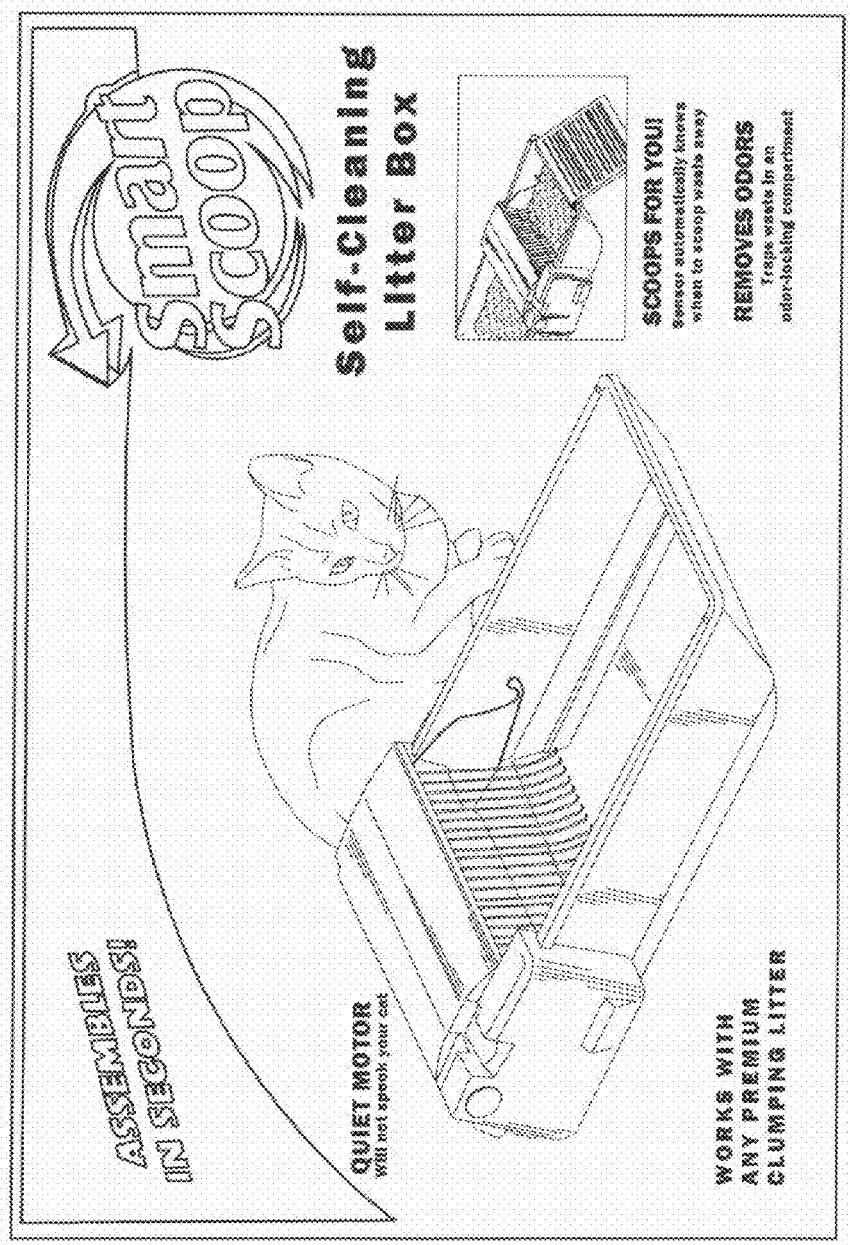
FIG. 5 is a perspective view of a commercial embodiment of the present invention.

A litter box lid 100 is shown in FIG. 4 according to the preferred embodiment of the present invention. The litter box lid 100 is designed to accommodate the features of the automated cat litter box 10 disclosed above. The lid 100 comprises a removable and washable fabric cover 110 held in position by a wire or sturdy frame 120. The frame 120 travels the length of the pan 12a having four pins 130 extending downwards at its ends to snap into the circular grooves 50 positioned on the corners of the automated litter box 10. The pins 130 also elevate the lid 100 so that the cleaning carriage 12b can travel below it and along the pan's lip 22 during an automated cleaning. The cover 110 covers the pan 12a from in front of the self-cleaning carriage 12b to its opposite end. A ventilation hole 140 or filter positioned on the top of the lid provides fresh air to the internal space created there between.

Figure 6:
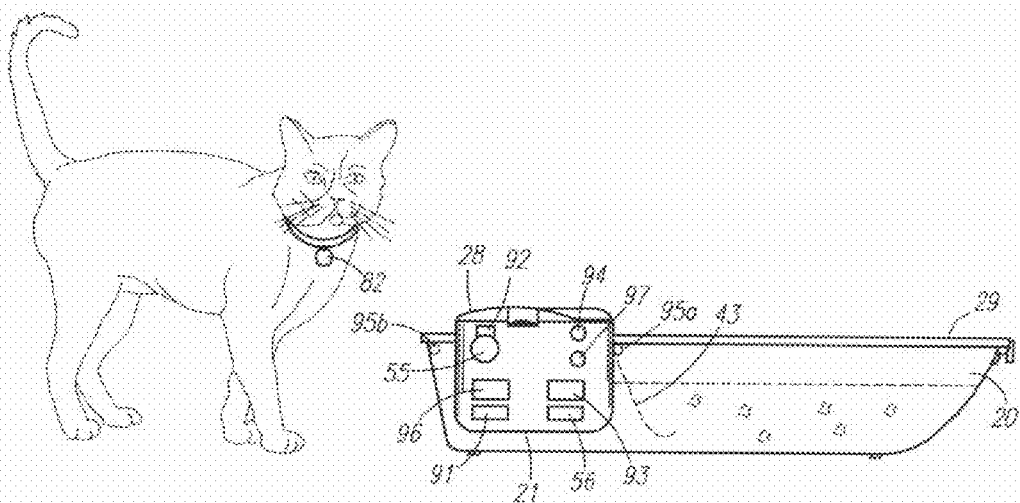
FIG. 6 is a pictorial representation of a novel and improved method of initiating a scooping or cleaning cycle according to the preferred embodiment of the present invention.
Figure 7:
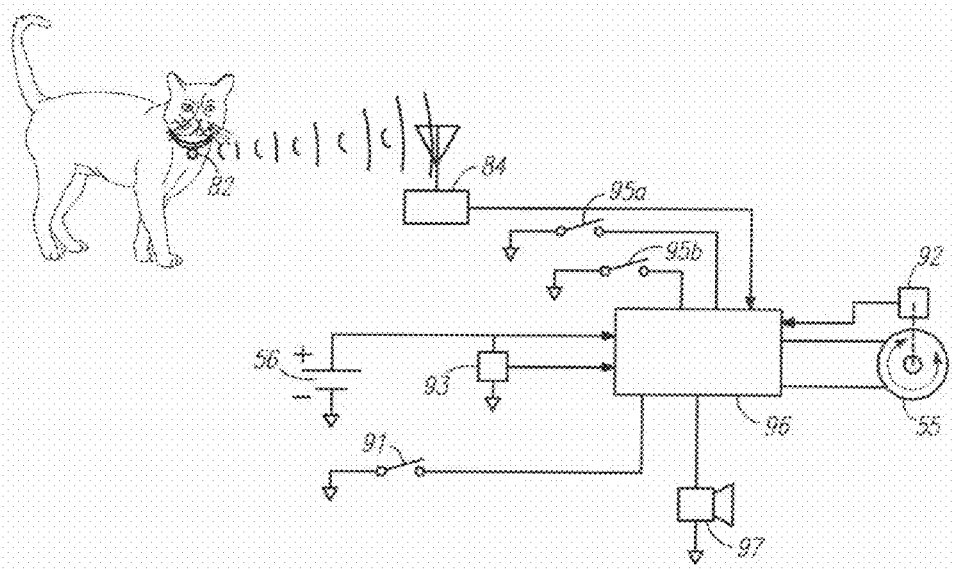
FIG. 7 is an electrical schematic therefor.

As shown in conjunction with FIG. 6 and FIG. 7, the improved automated self-scooping litter box 20 further comprises a radio frequency identification (RFID) sensor located on or worn by the animal to accurately and repeatably sense the presence of a cat in relation to the housing 21 in which an RFID receiver is located. Herein, RFID and any form of inductive transmitter are used interchangeably. A block diagram for the operating circuit of the improved automated self-cleaning litter box 20 is presented in FIG. 7. As shown therein, motor 55 is energized from battery 56 through a pre-programmed micro-processor control 96. Micro control 96 receives input signals from cat sensors 82 and 84. Additional inputs to control 96 may be supplied by a mode select switch 91, a motor stall sensor 92, a battery voltage sensor 93, and a home position sensor 94 for comb 43. Limit switches 95 may be provided for the comb at the storage end 28 of litter box 20 and at the discharge end 29 of the litter box. One or more buzzers or other alarm devices 97 are included in the circuit so that the cat owner can be signalled when the litter box is functional or when other conditions occur, such as an insufficient litter supply in box 20 or a full waste receptacle 68. Circuit components 91-93 and buzzer 97 may all be packaged in the same housing with motor 55. Sensor 94 and limit switches 95 can be incorporated in litter box 20 in appropriate positions as desired.

2. Operation of the Preferred Embodiment

In operation, it may be assumed that a cat (not illustrated) wearing a radio frequency passive transmitter as a lightweight identification tag enters litter box 20 for the purpose of elimination of either liquid or solid waste. The receiver accurately knows when the cat approaches the limited transponder range, and can track the animal continuously within this range. In fact, the animal can be tracked such that any automation cycle in not initiated until after the animal has entered the litter box, or entered the litter box for a sufficient time. Further, rather than a standard or random time delay before actuation of the rake or comb drive, the current design can delay such actuation until after the animal exits the litter box and moves to a safe distance therefrom. In such a circumstance, there is no need to utilize an estimated time after the animal breaks a photo detector beam to assume that the animal is done utilizing the device. Similarly, the cleaning cycle can be actuated immediately upon the cat moving a sufficiently safe distance away from the device.

Such a method and device eliminate any safety concerns with the rake or comb drive of the device operating while an animal is in (or near). Further, such an apparatus and method can allow operation of the device immediately, without delay, as soon as the animal is done utilizing the litter box.

The foregoing descriptions of specific embodiments of the present invention have been presented for purposes of enabling an illustration and description as required by (Cite the enablement section for PROVISIONALS). They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined broadly by the Drawings and Specification and Claims appended hereto and their equivalents. Therefore, the scope of the invention is in no way to be limited only by the following exemplary claims.

The invention claimed is:

1. An automated cat litter box having a covered, deep, rectangular pan and a cleaning carriage at said pan's distal end comprising:
   a waste drawer;
   a rotatable grate vertically attached thereto;
   a driving mechanism; and,
   a cat proximity sensor for sensing the relative position of a cat about or within said litter chamber;
   wherein said cat proximity sensor is capable of identifying the location of a cat outside the litter box or litter chamber.

2. The automated litter box of claim 1, wherein said cat proximity sensor comprises:
   a passive or inductive transmitter for identification for modulating and demodulating a radio frequency (RF) signal; and
   an antenna for receiving and transmitting a radio frequency (RF) signal.

3. The automated cat litter box of claim 2, wherein said waste drawer comprises:
   a hingedly attached lid;
   a tray sized to fit into said waste drawer; and
   a disposable plastic cover or a lining placed over said tray, wherein said tray can be lifted out of said waste drawer and the waste contents therein discarded by means of an outwardly extended handle positioned on said tray.

4. The automated cat litter box of claim 3, wherein a rectangular indentation in the top edge of said drawer and a curved indentation on the edge of said lid form a window for said handle to fit through when said tray is positioned in said drawer and said lid is closed.

5. The automated cat litter box of claim 3, wherein the length of said waste drawer travels along the width of said litter pan and the depth of said waste drawer approximates half the depth of said litter pan.

6. The automated cat litter box of claim 2, wherein said cleaning carriage rests on a lip of said litter pan by means of an engagement rail positioned at its opposite sides.

7. The automated cat litter box of claim 2, wherein said litter pan comprises a guiding rim that extends outwards from the interior sidewall of said pan.

8. The automated cat litter box of claim 7, wherein said lip and said guiding rim guide said cleaning carriage during an automated cleaning.

9. The automated cat litter box of claim 2, wherein said rotatable grate comprises vertical or curved tines connected to a pivot rod.

10. The automated cat litter box of claim 2, wherein said pan shallows and curves at the end opposite where said carriage rests.

11. The automated cat litter box of claim 10 further comprising a ramp having horizontal ridges at said shallow end.

12. The automated cat litter box of claim 2, wherein said driving mechanism is contained in a cabin positioned on the outside of said pan, but attached to and adjacent to said waste drawer.

13. The automated cat litter box of claim 12, wherein a push lock release positioned on a top lid of said cabin provides access to a motor and mechanical elements used to drive said cleaning carriage.

14. The automated cat litter box of claim 13, wherein said pins extend downwards from said frame traveling said length of said pan to elevate said cover so that said cleaning carriage can travel said lip during said automated cleaning.

15. The automated cat litter box of claim 14, wherein a ventilation or a filter hole positioned on the top of said cover provides fresh air to the internal space created there between.

16. The automated cat litter box of claim 12, wherein a hand crank positioned on the outside of said cabin provides means to manually drive said cleaning carriage.

17. The automated cat litter box of claim 2 further comprising four circular grooves at its corners, wherein pins positioned on the cover of said litter box snaps into said circular grooves to hold said cover in place.

18. The automated cat litter box of claim 17, wherein said cover comprises a removable and a washable fabric cover held in position by a wire or a sturdy frame.

* * * * *